(12) United States Patent
Eiden et al.

(10) Patent No.: US 7,151,920 B2
(45) Date of Patent: Dec. 19, 2006

(54) SYSTEM FOR PROTECTING PICTURES USED IN WIRELESS COMMUNICATION MESSAGES

(75) Inventors: Niko Eiden, Helsinki (FI); Kimmo Hämynen, Espoo (FI)

(73) Assignee: Nokia Corporation, Espoo (FI)

( * ) Notice: Subject to any disclaimer, the term of this patent is extended or adjusted under 35 U.S.C. 154(b) by 417 days.

(21) Appl. No.: 10/023,438

(22) Filed: Dec. 18, 2001

(65) Prior Publication Data

US 2003/0114137 A1    Jun. 19, 2003

(51) Int. Cl.
*H04M 11/00* (2006.01)

(52) U.S. Cl. ............. 455/403; 455/556; 455/410; 455/420; 455/412

(58) Field of Classification Search ......... 455/403, 455/412, 556, 410, 420; 348/231.6; 345/619, 345/1.1, 522; 329/88.13
See application file for complete search history.

(56) References Cited

U.S. PATENT DOCUMENTS

| | | | |
|---|---|---|---|
| 6,320,595 B1* | 11/2001 | Simons et al. | 345/619 |
| 6,714,204 B1* | 3/2004 | Ishida et al. | 345/522 |
| 2002/0078157 A1* | 6/2002 | Matsumoto | 709/206 |
| 2002/0090068 A1* | 7/2002 | Song | 379/88.13 |
| 2003/0007078 A1* | 1/2003 | Feldis, III | 348/231.6 |
| 2003/0034934 A1* | 2/2003 | Brewer | 345/1.1 |
| 2003/0069004 A1* | 4/2003 | Hamynen et al. | 455/412 |
| 2004/0210845 A1* | 10/2004 | Paul et al. | 715/731 |

FOREIGN PATENT DOCUMENTS

| | | |
|---|---|---|
| EP | 1 091 601 A2 | 11/2001 |
| WO | WO 00/57617 | 9/2000 |

OTHER PUBLICATIONS

U.S. Appl. No. 09/864,855, filed May 23, 2001, Lehto et al.
U.S. Appl. No. 09/864,897, filed May 23, 2001, Orpano et al.
Enhanced Messaging Service White Paper, Revised Edition (Mar. 2001) Ericsson Mobile Communications AB, published on the Internet; Publication No. LZT 108 4854 R1B.
Kessler Wireless Design—Smart FAQ, published on the Internet, www.kessler-design.com, 2001 Kessler Design.
Global System for Mobile Communications, Digital Cellular Telecommunications System (Phase 2+ 1); Technical Realization of the Short Message Service (SMS), Point-to-Point (PP), (GSM 03.40), GSM Technical Specification, Jul. 1996, Sec. 9.2.3, p. 46-60.
Peersman, G., Cvetkovic, S., Griffiths, P. and Spear, H., The Global System for Mobile Communications Short Message Service, IEEE Personal Communications, Jun. 2000, p. 15-23.

* cited by examiner

*Primary Examiner*—Erika A. Gary
*Assistant Examiner*—David Q. Nguyen

(57) ABSTRACT

A wireless terminal (10) (and associated method) for protecting pictures (11a, 11b) stored in the wireless terminal for use in messages communicated via a wireless communication system. The wireless terminal includes a picture manager (10) that embeds a predetermined tag (12) in a picture (11a) indicating whether or not the picture is editable (using the picture manager), according to commands by the user after creating the picture.

14 Claims, 3 Drawing Sheets

SYSTEM FOR PROTECTING PICTURES USED IN WIRELESS COMMUNICATION MESSAGES

RELATED APPLICATIONS

The present invention is related to the following U.S. applications:

Ser. No. 09/864,855, entitled System and Protocol for Extending Functionality of Wireless Communication Messaging, filed May 23, 2001.

Ser. No. 09/864,897, entitled System for Personal Messaging, filed May 23, 2001.

Ser. No. 09/972,148, entitled System and Protocol for Providing Pictures in Wireless Communication Messages, filed Oct. 4, 2001.

The present invention is also related to the following international application:

International application no. PCT/EP00/02370, entitled Communication Terminal Handling Messages Including Graphics, filed Mar. 16, 2000, which claims priority to GB application no. 9906316.6, filed Mar. 18, 1999.

The related applications are assigned to the present assignee. The subject matter of the related applications are hereby incorporated by reference in their entirety.

FIELD OF THE INVENTION

The present invention pertains to wireless communication messaging (as opposed to voice wireless communication). More particularly, the present invention relates to digital rights management for pictures and text communicated over a wireless communication system via for example the so-called Short Message Service.

BACKGROUND OF THE INVENTION

In recent years, data services have become popular for mobile communications systems, including the very popular so-called short messaging service (SMS), which makes use of underutilized bandwidth of signaling channels to allow short text messages. With SMS, users are able to exchange alphanumeric messages (up to 160 characters in length), and the messages are delivered within seconds of their being transmitted. Of course the networks traversed in providing the messages from one user to another must all be digital cellular networks. Although SMS was originally conceived as a paging mechanism for notifying users of the arrival of voicemail, it is now used primarily as a messaging service. A new use for SMS is a picture messaging application for cellular telephones that is presently being offered by the assignee hereof for allowing users to create and download picture messages into a proprietary mobile telephone (e.g. the Nokia 3210 GSM) and send the pictures to another, compatible proprietary telephone (e.g. another Nokia 3210 or a Nokia 8210 or Nokia 8850). With a likewise proprietary messaging platform (e.g. the Nokia Artus Messaging Platform), operators are able to enhance usage of SMS for their subscribers. Such a simple graphic message service provides a black-and-white picture, of a size for example of 72×28 pixels, along with a short greeting displayed below the picture; a maximum size of the greeting is for example 120 characters.

Co-owned and co-pending application Ser. No. 09/972, 148 describes a picture editor, provided as software included in a mobile phone, that allows a user to create, store and edit pictures for use in messages sent via the mobile phone using for example SMS. The pictures can be created from scratch or can be created by modifying existing pictures. In addition, it is envisioned that pictures will be made available for downloading over the air interface by special picture downloading servers. Such pictures will usually be pictures created by companies interested in advertising a product or service the company offers for sale.

Since a company that provides a picture advertising a product or service will often want a user to be prevented from editing the picture (because for example the user might slightly alter the picture and use the picture for the user's own benefit, and the company might find the alteration disparaging to the product or service in some way).

What is therefore needed is a way to signal to a picture editor, such as one described in co-owned and co-pending patent application Ser. No. 09/972,148, whether a picture should or should not be protected from being altered by a user.

SUMMARY OF THE INVENTION

Accordingly, in a first aspect of the invention, a wireless terminal is provided for communicating pictures via a wireless communication system, the wireless terminal including: a picture manager, responsive to signals indicating pictures, for displaying the pictures each of which are either editable or non-editable as indicated by a predetermined tag embedded in the picture, and for examining each of the pictures to determine whether each of the pictures includes the predetermined tag and so is either editable or non-editable depending on whether a tag in a picture is pre-agreed to signify that the picture is editable or is non-editable, for providing signals indicating edited and non-edited pictures; and a picture source, for providing the signals indicating pictures along with optional associated text, responsive to the signals indicating the edited and non-edited pictures.

In accord with the first aspect of the invention, the picture manager may not enable editing a picture if the picture includes the predetermined tag.

Also in accord with the first aspect of the invention, the picture manager may enable editing a picture only if the picture includes the predetermined tag.

Still in accord with the first aspect, the predetermined tag may be visible to a user of the wireless terminal only if the wireless terminal is placed by the user into a mode of operation allowing editing of an editable picture.

Yet even still in accord with the first aspect, the wireless terminal may also include a memory device, and the picture manager may automatically save downloaded pictures including the predetermined tag in a different location in the memory device from where the picture manager saves downloaded pictures not including the predetermined tag.

In addition, in a second aspect of the invention, a system is provided including: a wireless terminal for communicating pictures via a wireless communication system, the wireless terminal in accord with the first aspect or in further accord with any of the above arrangements in accord with the first aspect of the invention; and also a base station transceiver, for providing communication between the wireless terminal and other communication devices. In the last above arrangement, where the wireless terminal may also include a memory device, the system also includes equipment providing pictures for downloading, for providing the signals indicating the pictures.

In a third aspect of the invention, a method is provided for use by a wireless terminal used in communicating pictures via a wireless communication system, the method including:

an examination step, responsive to a picture, for examining the picture to determine whether the picture includes a predetermined tag, for providing an indication of whether or not the picture includes the predetermined tag; and a mode guard step, for enabling editing of the picture depending on the indication of whether or not the picture includes the predetermined tag.

In accord with the third aspect of the invention, in the mode guard step, a user may be allowed to edit the picture only if the picture includes the predetermined tag.

Also in accord with the third aspect of the invention, in the mode guard step, a user may not be allowed to edit the picture if the picture includes the predetermined tag.

Still in accord with the third aspect, the method may also include a step of displaying the predetermined tag so that it is visible to a user only if the user places the wireless terminal into a mode of operation allowing editing of an editable picture.

Even still in accord with the third aspect, in the examination step, a downloaded picture having the predetermined tag may be automatically saved in a different location in a memory device from where a downloaded picture not including the predetermined tag is saved.

BRIEF DESCRIPTION OF THE DRAWINGS

The above and other objects, features and advantages of the invention will become apparent from a consideration of the subsequent detailed description presented in connection with accompanying drawings, in which.

BEST MODE FOR CARRYING OUT THE INVENTION

The invention provides a way to protect from editing by a user a picture held in memory in a mobile phone. A picture that can be so protected according to the invention is a picture that is intended for use in a message communicated to another mobile phone (or another terminal) over a wireless communication system, for example the Global System for Mobile Communications (GSM) wireless communication system. Such a picture is preferably at most 72×28 pixels in size so as to be able to be communicated as a GSM picture using the Short Message Service (SMS) protocol.

Figure 1:
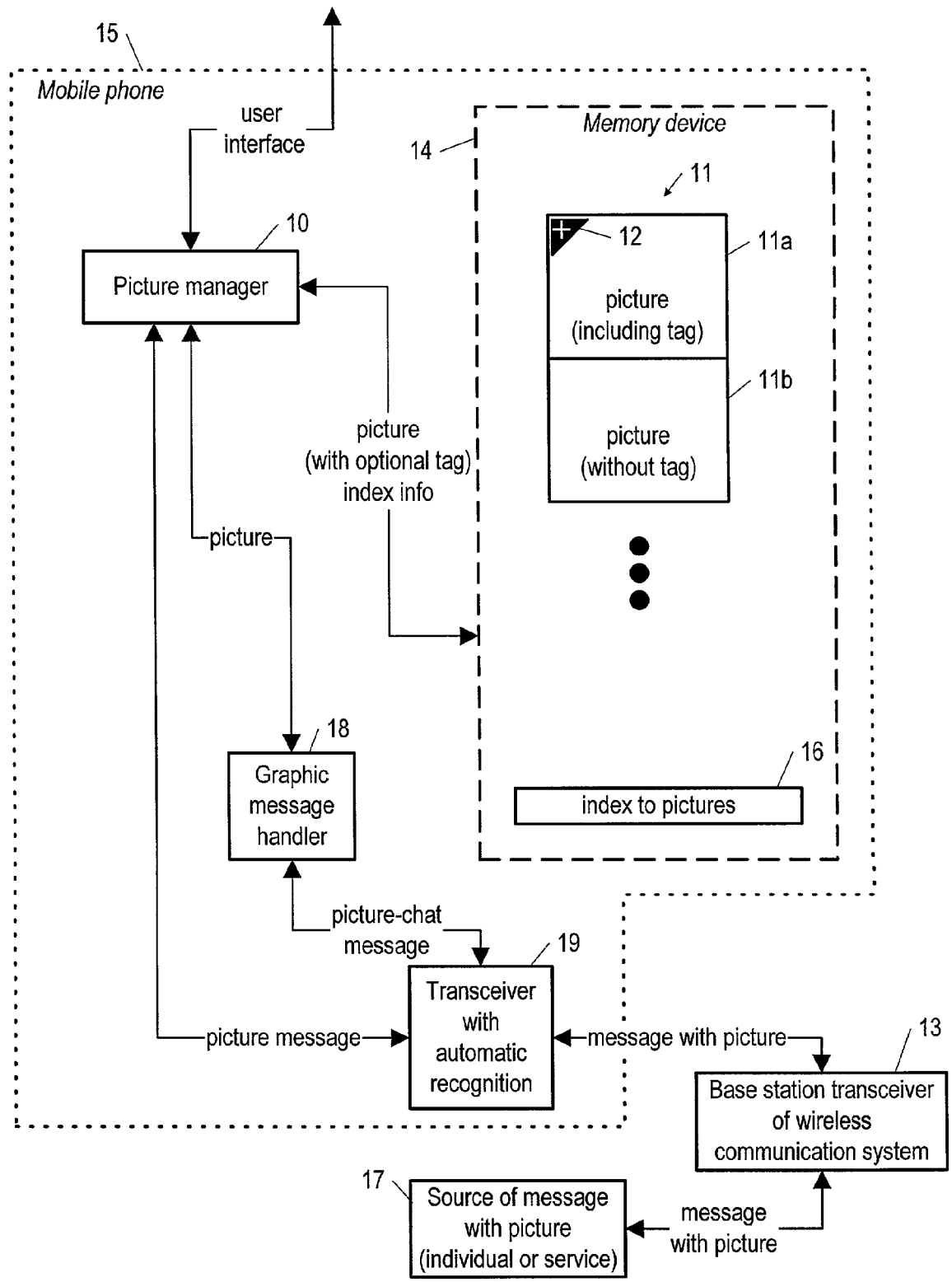
FIG. 1 is a block diagram of the components of a mobile phone needed to practice the present invention.

Referring now to FIG. 1, a mobile phone 15 according to the invention is shown as including a picture manager 10 for creating, viewing, communicating, and saving pictures 11a 11b to a memory device 14 embedded in the mobile phone. In particular, the picture manager 10 includes a picture editor, for enabling a user to modify a picture either selected from the memory device 14 via an index 16 or received from a picture source 17 (either another user or a picture server, i.e. a server offering pictures for downloading) over the air interface via a base station transceiver 13 (or a so-called node B) of a wireless communication system. According to the invention, the pictures preferably include a tag 12 in the form of a predetermined bit map located in the top left corner if the picture is not to be protected from being altered; by embedding a tag in a picture that is editable, as opposed to embedding a tag in a picture that is to be protected, pictures created by commercial sources are not in any way made less appealing by the presence of a tag. (Since embedding a tag in a picture to signal that the picture is editable is new, there are already many pictures stored in mobile phones that were not intended to be protected, the preferred implementation of the tag protection provided by the invention calls for enabling the protection only for pictures created after some to be determined date.)

Preferably, the mobile phone 10 includes a transceiver module 19 with an automatic recognition capability so as to be able to determine whether a picture-bearing object received via the wireless communication system is a picture only, or also includes text. If the object is a picture only, it is provided directly to the picture manager 10; if a picture with text, it is provided to a graphic message handler 18, which interfaces with the picture manager for handling the picture component of the object.

Figure 2:
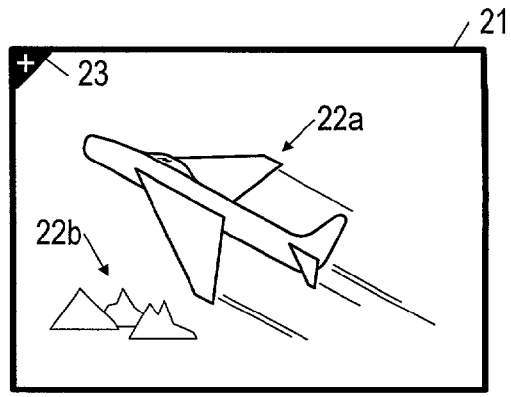
FIG. 2 is an illustration of a picture including a tag, according to the invention, indicating whether the picture is to be protected from being edited.

Referring now to FIG. 2, a rectangular picture 21 is shown including various picture elements 22a 22b, and also including an embedded tag 23 according to the invention, signifying that the picture is not protected against editing. The picture manager 10 (FIG. 1) would therefore permit a user to edit the picture 21, and, after editing the picture, either remove the tag (and so prevent further editing) or leave the tag in place (so that the picture manager 10 will continue to allow editing of the picture 21).

Still referring to FIG. 2, a free-to-edit tag 23 according to the invention need not be located in any particular location in a picture 21. It is advantageous to be able to place a tag in a location in a picture that will not significantly interfere with the picture elements. Usually, such a location will be somewhere on the periphery of a picture. Allowing such flexibility in locating a tag complicates the software executed by the picture manager 10 (FIG. 1) in determining whether or not a tag is present or in determining where to place a tag, and so, preferably, a tag, if present, is always located in the same location in a picture, such as the top left corner, as shown in FIG. 2 (and also in FIG. 1).

Since pictures can be different sizes (usually measured in pixels, and usually at most 72×28 pixels in size), to simplify for the picture manager 10 the task of determining whether a tag is present in a picture, the picture is scaled to a predetermined standard size. Then, to determine if a tag is present in the picture, the picture manager slides a tag image over the picture (not on the screen, but in the memory of the mobile phone used for executing software), stopping at each new location to compare with the tag image the part of the picture covered with the tag image. As mentioned above, a free-to-edit tag is preferably located in the top left corner of a picture, and so, in the preferred embodiment, it is not necessary for the picture manager to slide (in memory) a tag image over the picture. All that is necessary in the preferred embodiment is to compare pixel-by-pixel the tag image with the top left corner of the picture, the picture having previously been scaled to a standard size.

Besides embodiments in which a free-to-edit tag 23 such as is shown in FIG. 2 is visible to a user, the invention also comprehends embodiments in which a free-to-edit tag is either never made visible to the user but a message is displayed to the user if an invisible tag is not present, informing the user that the picture is not editable. In addition, the invention comprehends embodiments in which instead of providing a free-to-edit tag, an edit-guard tag is provided, preferably one that is never visible to a user. In the case of embodiments using an invisible tag, the picture manager 10 (FIG. 1) signals to the display unit (not shown) that the pixels where the tag resides are to be left in their non-illuminated state. As another alternative, a tag, be it either a free-to-edit tag or an edit-guard tag, is visible in a picture only if the user attempts to edit the picture (i.e. for example, an edit-guard tag shows up only if a user attempts to edit a protected picture).

Figure 3:
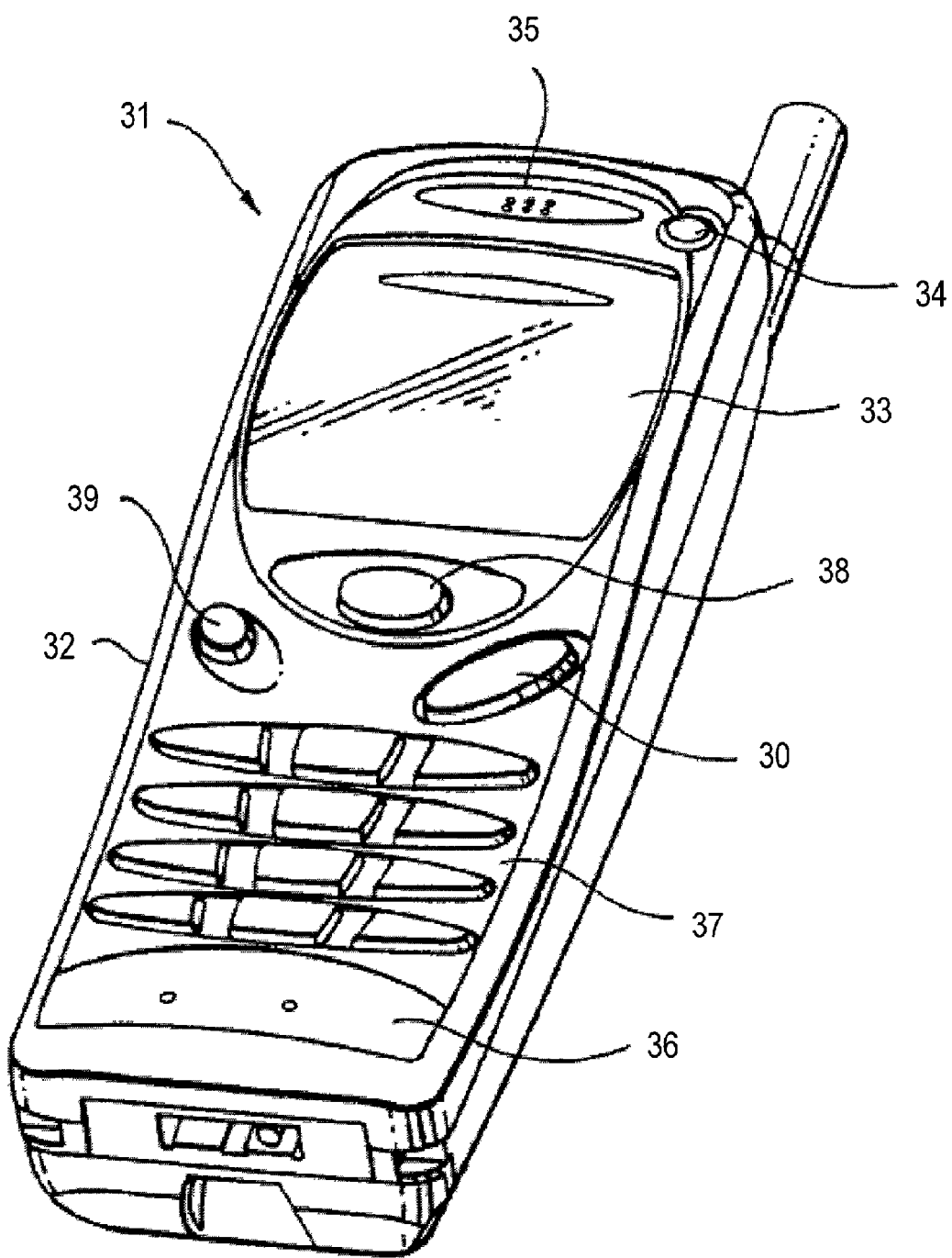
FIG. 3 is a perspective drawing of a mobile phone (wireless terminal) of a type able to practice the invention.

Referring now to FIG. 3, a mobile phone of a type in which the invention can be implemented are shown. The phone, which is generally designated by 31, comprises a user interface having a keypad 32, a display 33, an on/off button 34, a speaker 35, and a microphone 36 (only openings are shown). The phone according to the preferred embodiment is adapted for communication via a cellular network, but could have been designed for a cordless network as well. According to the preferred embodiment the keypad 32 has a first group 37 of keys as alphanumeric keys, a soft key 38, a clear key 39, and a navigation key or a scroll key 30. (A soft key is a key with which a function is associated that depends on the state of the mobile phone. There can be one or more such soft/function keys, although in FIG. 3, only a single soft key is shown. The particular function that is associated with a soft key is indicated in the display of the mobile phone.) The present functionality of the soft key 38 is shown in a separate field in the display 33 just above the key 38.

Figure 4:
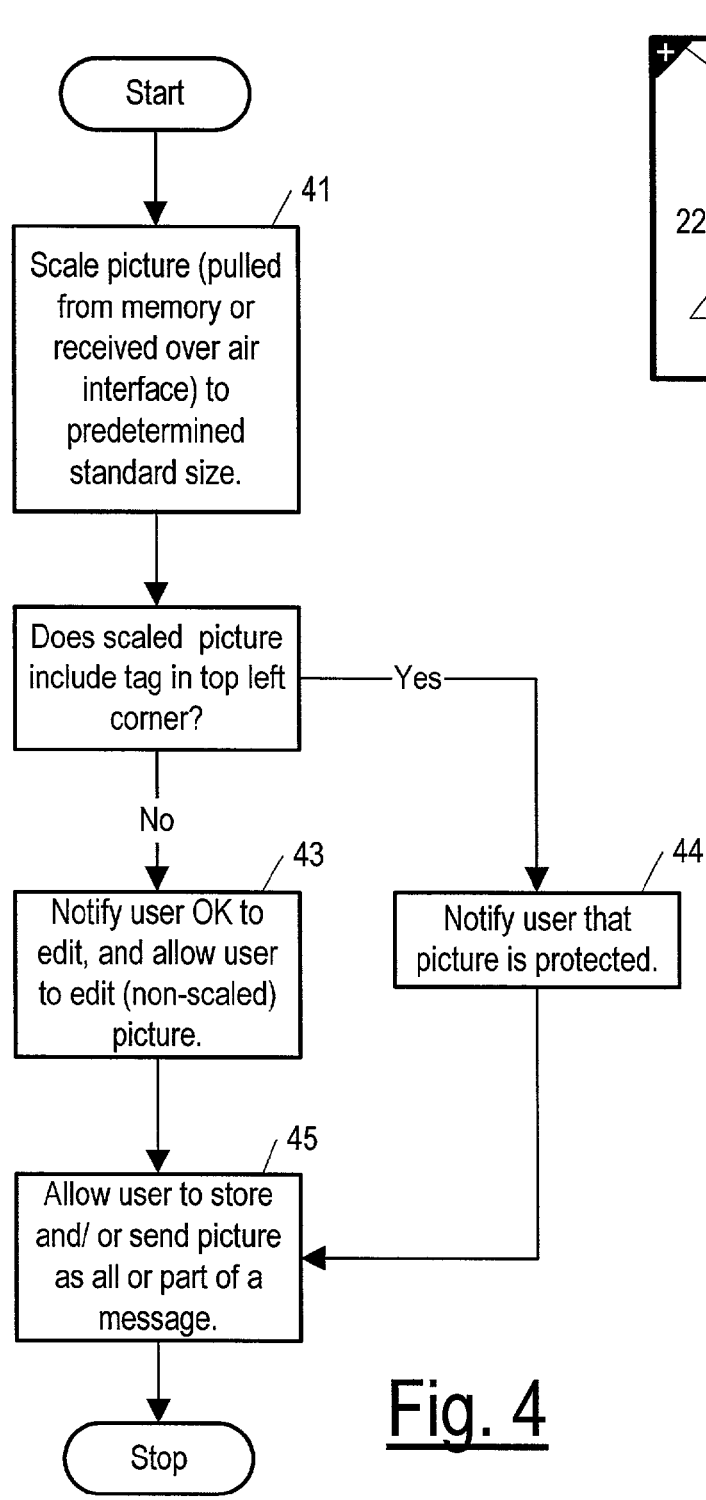
FIG. 4 is a flowchart indicating operation according to the invention of the mobile phone of FIG. 1 in respect to editing a picture.

Referring now to FIG. 4, the operation of the picture manager 10 (FIG. 1) in the preferred embodiment (a free-to-edit tag in the top left corner of a picture) is shown in respect to determining whether a (free-to-edit) tag is present in a picture. The operation includes a first step 41 in which the picture is scaled to a predetermined size (such as 72×28 pixels), even if such scaling deforms the picture. In a next step 42, the picture manager determines whether the top left corner of the scaled picture includes a tag by comparing the pixels of the top left corner with a tag image (held in memory by the picture manager). In one step 43 of two possible next steps 43 44, if the tag is absent, the picture manager displays a message to the user indicating that the picture is editable, and allows the user to edit the picture (including embedding a tag in the picture to prevent further editing). Alternatively, in the other step 44 of the two possible next steps 43 44, the picture manager displays a message to the user indicating that the picture is protected, and so cannot be edited. Then in a final step 45, the picture manager makes available to the user an interface allowing the user to send the picture to another, and/or save the picture in the mobile phone. (The user may have just downloaded the picture from a service, and the user may not wish to send the picture to anyone at the time, but instead may wish to simply save the picture for later use.)

Figure 5:
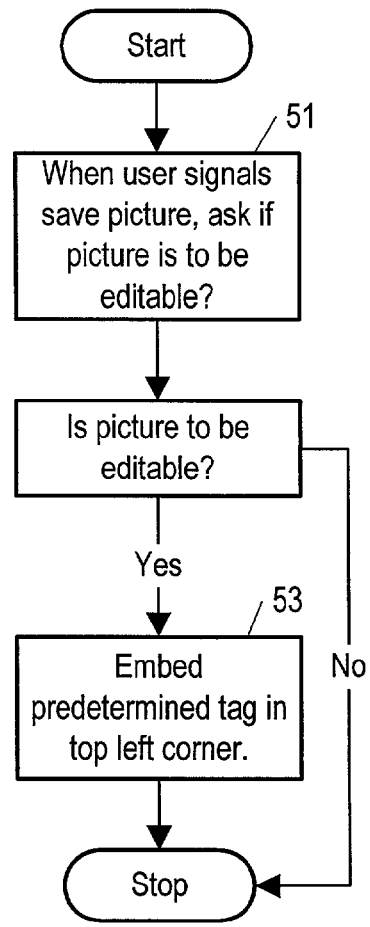
FIG. 5 is a flowchart indicating operation according to the invention of the mobile phone of FIG. 1 in respect to embedding a tag in a picture to indicate whether the picture is editable.

Referring now to FIG. 5, the operation of the picture manager 10 (FIG. 1) in the preferred embodiment (a free-to-edit tag in the top left corner of a picture) is shown in respect to determining whether or not to embed a free-to-edit tag in a picture. The operation includes a first step 51 in which, once a user, who has been using the picture manager to edit or create a picture from scratch, commands the picture manager to save the picture, the picture manager asks the user whether the picture is to be protected against editing. If the user reply is no, then in a next step 53, the picture manager embeds a predetermined free-to-edit tag in the top left corner of the picture. In a follow-on step not shown, the picture manager then saves the picture with the embedded tag. If the user reply is no, then in the follow-on step not shown, the picture manager saves the picture without embedding a tag.

Referring again to FIG. 1, advantageously in some embodiments, based on whether or not a downloaded picture includes a free-to-edit tag, picture manager 10 can automatically store/save the picture in a free-to-edit folder or a not-free-to-edit folder in the memory device 14. In such embodiments, pictures 11a without a tag would be stored in a separate folder (of files) from pictures 11b with a tag, and the user knows based on the location of a file containing a picture whether or not the picture is free to edit, and so need not open the file for a picture and inspect it to determine whether the picture is editable.

SCOPE OF THE INVENTION

It is to be understood that the above-described arrangements are only illustrative of the application of the principles of the present invention. Numerous further modifications and alternative arrangements besides those indicated above may be devised by those skilled in the art without departing from the scope of the present invention, and the appended claims are intended to cover such modifications and arrangements.

What is claimed is:

1. A wireless terminal for communicating pictures via a wireless communication system, the wireless terminal comprising a picture manager, responsive to signals indicating pictures, the picture manager being configured to display the pictures each of which is editable if indicated by a free-to-edit tag embedded in the picture, configured to examine each of the pictures to determine whether each of the pictures includes the free-to-edit tag so as to be editable thus allowing a user to alter the content of at least a portion of the picture, and configured to enable editing of each of the pictures received by the user only if the free-to-edit tag is included in the picture received by the user, wherein the wireless terminal further comprises a memory device, and a picture source for providing the signals indicating the pictures, and wherein the picture manager automatically saves downloaded pictures including the free-to-edit tag in a different location in the memory device from where the picture manager saves downloaded pictures not including the free-to-edit tag.

2. A wireless terminal as in claim 1, wherein the free-to-edit tag is visible to the user, and wherein the picture manager is capable of deleting the free-to-edit tag from the picture.

3. A wireless terminal as in claim 2, wherein the picture manager is also equipped to prompt the user regarding creating the free-to-edit tag, if the user has created the picture.

4. A wireless terminal as in claim 1, wherein the free-to-edit tag is visible to a user of the wireless terminal only if the wireless terminal is placed by the user into a mode of operation allowing editing of an editable picture.

5. A system, comprising:

i) a wireless terminal for communicating pictures via a wireless communication system, the wireless terminal as claimed in claim 3; and ii) a base station transceiver, for providing communication between the wireless terminal and other communication devices.

6. A system, comprising:
i) a wireless terminal for communicating pictures via a wireless communication system, the wireless terminal as claimed in claim 2; and
ii) a base station transceiver, for providing communication between the wireless terminal and other communication devices.

7. A system, comprising:
i) a wireless terminal for communicating pictures via a wireless communication system, the wireless terminal as claimed in claim 4; and
ii) a base station transceiver, for providing communication between the wireless terminal and other communication devices.

8. A system, comprising:
i) a wireless terminal for communicating pictures via a wireless communication system, the wireless terminal as claimed in claim 1; and
ii) a base station transceiver, for providing communication between the wireless terminal and other communication devices.

9. A system, comprising:
i) a wireless terminal for communicating pictures via a wireless communication system, the wireless terminal as claimed in claim 1; and
ii) a base station transceiver, for providing communication between the wireless terminal and other communication devices responsive to signals indicating pictures.

10. A system as claimed in claim 9, further comprising equipment providing pictures for downloading, for providing the signals indicating the pictures.

11. A method for use by a wireless terminal used in communicating pictures via a wireless communication system, the method comprising:

responsive to a picture, examining the picture to determine whether the picture includes a free-to-edit tag, and enabling editing of each of the pictures received by a user only if the free-to-edit tag is included in the picture received by the user wherein a downloaded picture having the free-to-edit tag is automatically saved in a different location in a memory device from where a downloaded picture not including the free-to-edit tag is saved.

12. A method as in claim 11,
wherein the free-to-edit tag is visible to the user, and
wherein the method includes optionally deleting the free-to-edit tag from the picture.

13. A method as in claim 12, further comprising prompting the user regarding creating the free-to-edit tag, if the user has created the picture.

14. A method as in claim 11, further comprising a step of displaying the free-to-edit tag so that it is visible to a user only if the user places the wireless terminal into a mode of operation allowing editing of an editable picture.

* * * * *